May 27, 1930.  M. D. STALDER  1,760,020
TROLLEY BEARING
Filed July 27, 1928
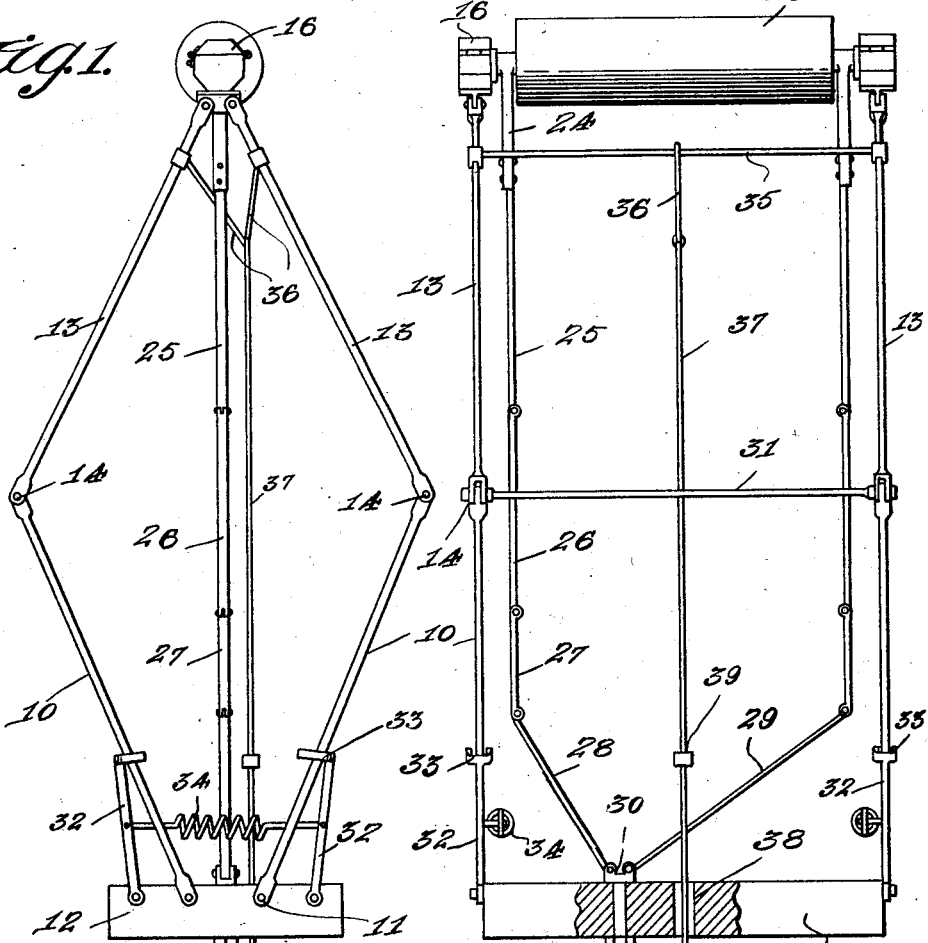

Patented May 27, 1930

1,760,020

UNITED STATES PATENT OFFICE

MERLE D. STALDER, OF CLEVELAND, OHIO, ASSIGNOR OF ONE-FOURTH TO JAMES F. CAFFREY, OF CLEVELAND, OHIO

TROLLEY BEARING

Application filed July 27, 1928. Serial No. 295,815.

This invention primarily relates to a new and improved type of trolley harp.

An object of the invention comprehends a rotatable element of sufficient length to permit the trolley wire to remain in contacting engagement therewith while the vehicle is rounding curves etc.

Another object of the invention contemplates a supporting structure for the rotatable element.

An additional object of the invention consists in the provision of bearing members for the rotatable element upon the supporting structure.

More specifically stated the supporting structure is resiliently retained in position for use whereby the rotatable element will be tensioned against the trolley wire when the vehicle encounters uneven road beds.

With the above and other objects in view, the invention further consists in the following novel features and details of construction, to be hereinafter more fully described, illustrated in the accompanying drawing and pointed out in the appended claims.

In the drawing:—

Figure 1 is a side elevation of the invention.

Figure 2 is an end elevation thereof.

Figure 3 is a sectional view taken through one of the bearing members.

Figure 4 is a detail sectional view taken through the connection of one of the bearing members and the adjacent portion of the rotatable element.

Figure 5 is a plan view of a replacement for the rotatable element.

Referring to the drawing in detail, wherein like characters of reference denote corresponding parts, the reference characters 10 indicate leg members of a supporting structure pivotally mounted, as at 11, upon a block 12 adapted to be carried upon the upper side of the trolley car or the like, and extended outwardly and upwardly therefrom.

Companion legs 13, pivotally connected, as at 14, to the uppermost ends of the legs 10, are upwardly and inwardly curved therefrom for connection with ears 15 depending from housings 16. Said housings are adapted to support dielectric cup-shaped members 17 to insulate bearing members 18 from said housing. A shaft 19, carrying a rotatable element or drum 20, is extended through dielectric bushings 21 in adjacent sides of the housings 16 and keyed or otherwise fixed to the bearings 18, substantially as illustrated in Figure 4 of the drawing. Trough members 22, carried within the housings 16 beneath the undersides of the bearings 18, are adapted to retain surplus oil, whereby the bearings as rotated will be bathed in the lubricant retained thereby.

Brushes 23, loosely connected with the shaft 19 between the spiders at the ends of the rotatable element 20 and the bushings 21, are adapted for connection with channeled legs 24.

Successions of pivoted links 25, 26 and 27 respectively, arranged in end to end relation and depending from each of the channeled legs 24, are adapted for connection at their lowermost ends with links 28 and 29 respectively. A terminal 30, pivotally connected with the adjacent ends of the links 28 and 29, is adapted to be extended through the block 12 and suitably connected with the driving mechanism of the vehicle, not shown.

Connecting bars 31 are passed through the pivot connections 14 between the leg members 10 and 13 in the manner as illustrated in Figure 2 of the drawing, whereby swaying of the supporting apparatus will be obviated.

Folding elements, in the nature of rods 32, having pivotal connection at their lowermost ends with the block 12 adjacent the pivot connections 11 for the legs 10, terminate to provide horizontally disposed U-shaped extremities 33 upon the uppermost ends and adapted to accommodate the adjacent portions of the legs 10. Retractile springs 34 are employed to provide the means of connection between the pairs of rods 32 whereby the rotatable element 20 will be normally tensioned to occupy the position shown in Figures 1 and 2 of the drawing.

Inasmuch as the rotatable element 20 is constructed in the manner set forth, a trolley wire may shift from either side of the center thereof when the car sways or the trolley line whips. The especial construction will obviate harp jumping and the vehicle would not have to lose time on turns through fear of the harp jumping the trolley wire.

Connecting bars 35, horizontally disposed with relation to the supporting structure, are adapted for connection at their ends with the uppermost portions of the legs 13. Connecting links 36, having connection with the connecting bars 35, are associated with a common pull 37 passed through an aperture 38 in the block 12. A disk 39, carried at an appropriate point in the length of the pull 37 and of sufficient size to facilitate insertion within the aperture 38, is adapted to engage the underside of the block 12 when the rotatable element and supporting structure is lowered by stress exercised upon a handle member 40 depending from the lowermost end of the pull. Said pull is extended within the body of the vehicle whereby the harp may be operated from the inside.

The invention is susceptible of various changes in its form, proportions and minor details of construction, and the right is herein reserved to make such changes as properly fall within the scope of the appended claims.

Having thus described the invention, what is claimed is:—

1. A trolley harp construction comprising pivotally connected legs, bearing members carried upon the uppermost ends thereof, an elongated harp of cylindrical form having the axle therefor journaled within said bearings, brushes having connection with the axle being adapted to transmit electrical energy therefrom, and cup-shaped members carried within the bearing members to insulate the ends of said axle from the legs.

2. A trolley harp construction comprising pivotally connected leg members, bearing members carried upon the uppermost ends thereof, a harp of cylindrical formation having the ends of the axle therefor journaled within said bearings, dielectric cup-shaped members carried within the bearing members being adapted to insulate the ends of said axle from the legs, brushes having connection with the aforementioned portions of said axle, and a multiplicity of link members being adapted to provide the means of connection between the brushes and a common terminal.

3. A trolley harp construction comprising pivotally connected leg members, bearing members carried upon the uppermost ends thereof, a harp of cylindrical formation having the ends of the axle therefor journaled within said bearings, dielectric cup-shaped members carried within the bearing members being adapted to insulate the ends of said axle from the legs, brushes having connection with the aforementioned portions of said axle, a multiplicity of link members being adapted to provide the means of connection between the brushes and a common terminal, rods pivotally mounted adjacent the lowermost ends of the legs, U-shaped portions carried upon the uppermost portions of the rods and receiving said legs, and spring elements establishing connection between the companion rods to yieldingly retain the legs and harp in position for use.

In testimony whereof I affix my signature.

MERLE D. STALDER.